(12) United States Patent
Schwerdtner et al.

(10) Patent No.: US 7,400,431 B2
(45) Date of Patent: Jul. 15, 2008

(54) METHOD FOR ENCODING VIDEO HOLOGRAMS FOR HOLOGRAPHICALLY RECONSTRUCTING A SCENE

(75) Inventors: Armin Schwerdtner, Dresden (DE); Ralf Haussler, Dresden (DE); Norbert Leister, Dresden (DE)

(73) Assignee: SeeReal Technologies GmbH, Dresden (DE)

( * ) Notice: Subject to any disclaimer, the term of this patent is extended or adjusted under 35 U.S.C. 154(b) by 259 days.

(21) Appl. No.: 11/222,277

(22) Filed: Sep. 8, 2005

(65) Prior Publication Data

US 2006/0050340 A1 Mar. 9, 2006

(30) Foreign Application Priority Data

Sep. 8, 2004 (DE) .................. 10 2004 044 111

(51) Int. Cl.
*G03H 1/26* (2006.01)
*G02B 27/22* (2006.01)
(52) U.S. Cl. .................. 359/23; 359/15; 359/32; 359/462
(58) Field of Classification Search ............... 359/15, 359/23, 32, 22, 462
See application file for complete search history.

(56) References Cited

U.S. PATENT DOCUMENTS 4,116,526 A * 9/1978 Clay et al. .................. 359/10
5,521,724 A * 5/1996 Shires ........................ 359/22
6,157,474 A * 12/2000 Orr et al. .................... 359/23
6,980,176 B2 * 12/2005 Matsumoto et al. ......... 345/6

FOREIGN PATENT DOCUMENTS

WO  WO 03/021363 A1  3/2003
WO  WO 2004/044659 A2  5/2004

OTHER PUBLICATIONS

"Viewing-zone enlargment method for sampled hologram that uses high-order diffraction", Tomoyuki Mishina, Makoto Okui and Fumio Okano, Applied Optics, Mar. 10, 2002, vol. 41, No. 8; pp. 1489-1499.
"Electro-Holographic Display Using 15Mega Pixels LCD", Keiichi Maeno, Naoki Fukaya and Osamu Nishikawa, Advanced 3D Telecommunication Project, Mar. 1996, SPIE, vol. 2652; pp. 15-23.

* cited by examiner

*Primary Examiner*—Audrey Chang
(74) *Attorney, Agent, or Firm*—Synnestvedt & Lechner LLP

(57) ABSTRACT

A method and a device for encoding and reconstructing computer-generated video holograms using a conventional LC display: it provides holographic reconstruction of three-dimensional scenes using electronically controllable pixel in a holographic array (3) with a conventional resolution, and is reasonably free from flickering and cross-talk. Reconstruction is in real time, and for both eyes at the same time, over a large viewing zone. The method takes advantage of an optical focusing means (2) in order to image vertically coherent light emitted by a line light source (1) into viewing windows (8R, 8L) after modulation by the pixel array (3). The holographic reconstruction (11) of the scene is rendered visible from viewing windows (8R, 8L) for both eyes of an observer by way of diffraction at the pixels. According to the invention, the controllable pixels are disposed in vertical pixel columns (15, 16), which encode separate holograms of the same scene for each of the viewer's eyes (R, L), where said holograms are one-dimensional in the vertical direction and horizontally interleaved. An image separation means (7) with separating elements arranged parallel to the pixel columns reveals the respective pixel columns (15, 15' or 16, 16') for one eye and covers them for the other eye.

21 Claims, 2 Drawing Sheets

METHOD FOR ENCODING VIDEO HOLOGRAMS FOR HOLOGRAPHICALLY RECONSTRUCTING A SCENE

CROSS REFERENCE TO RELATED APPLICATIONS

This application claims the priority of German application DE 10 2004 044 111.1 filed on Sep. 8, 2004, the entire contents of which is hereby incorporated in total by reference.

BACKGROUND OF THE INVENTION

1. Field of the Invention

The invention relates to a method and device for encoding and reconstructing computer-generated large-area video holograms using a display with conventional (i.e. commercially available) resolution; the display gives a large viewing angle and a high spatial image quality. The display includes a holographic array with controllable pixels, which electronically affect the amplitude and/or phase of light. Such an array is known as spatial light modulator (SLM). A suitable array for spatial amplitude modulation of a light pattern to reconstruct video holograms is, for example a Liquid Crystal Display (LCD). However, this invention can also be applied to other controllable holographic arrays, which use coherent light for modulating a light wave front.

2. Definition of Terms

The term "pitch" describes in this document the distance between the centers of two adjacent pixels of an array. It thus characterizes the display resolution.

The term "encoding" describes the way in which the holographic array is supplied with control values so that it reconstructs a three-dimensional scene. According to this invention, the scene is viewable through 'viewing windows'.

A viewing window is the intersection of a viewing zone and an observer plane. The observer can see the reconstructed object if at least one eye is inside the viewing window.

3. Description of Related Art

A drawback of 3D-autostereoscopic displays using conventional optics is a mismatch between parallax information and the accommodation of the lens of the eye. On the one hand, each eye sees a different perspective view of a scene, which simulates a depth impression of objects at an arbitrary distance. On the other hand, each perspective view is located on the display surface itself. Hence, the eye focuses on the display surface, and each eye sees a flat image. This causes a mismatch between seeing objects at arbitrary depth (i.e. not on the display surface) achieved by parallax information and the accommodation of the eyes to the fixed display surface. This may cause an unpleasant feeling and eye fatigue. This can be avoided by using holographic displays, which reconstruct the objects of a 3D scene at correct depths.

A holographic display reconstructs objects by coherent superposition of light waves. For this purpose, a spatial light modulator (SLM) generates a wave pattern. This hologram is the Fresnel transform of the 3D scene which is to be reconstructed. The SLM diffracts the light waves and reconstructs the scene. As the hologram is sampled, a periodic replication occurs that is associated with a periodicity interval. Thus, the observer within a viewing zone given by the periodicity interval can see the reconstruction. The maximum diffraction angle of the SLM, which basically depends on the pixel pitch, determines the viewing zone. A major problem in encoding and reconstructing video holograms is that a sufficiently large viewing zone must be provided for viewing the reconstruction.

In conventional holographic displays, the viewing zone should cover at least the eye separation, which requires a pixel size of ca. 10 µm at most. Even for a small display area of 100 mm*100 mm, the pixel count will be of the order of 100 million. This causes costly hardware and long computation times even when the display is simplified to a horizontal-parallax only hologram. Currently available large-area displays typically use holographic arrays with a pixel pitch which only diffracts light into a very small viewing zone, so that it is impossible to view a reconstructed three-dimensional scene with both eyes.

Several solutions are known to solve these problems.

The document, K. Maeno, N. Fukaya, O. Nishikawal, "Electro-holographic display using 15 Mega pixels LCD", Advanced 3D Telecommunication Project, 1996, SPIE, Vol. 2652, refers to holographic 3D displays using commercially available Liquid Crystal Displays (LCD). This document describes a video hologram-reconstructing device that uses five special displays with a high resolution (instead of a conventional LCD with a low resolution); the viewing zone is enlarged because the resolution values of each display is combined to give an overall high resolution. All displays are joined either directly or by way of optical reproduction. Only horizontal parallax is used; vertical parallax is disregarded. The known solution requires a resolution of 15 Mega pixels provided in a unit of the five special displays: each has 3,200× 960 pixels to reconstruct a video hologram in a volume of only 50 mm×150 mm and a depth of 50 mm. The viewing zone is only 65 mm wide, corresponding to about the eye to eye separation distance, so that the scene can only just be viewed with both eyes. The required resolution depends on the desired size of the video hologram and the viewing zone. However, this arrangement has significant disadvantages: use of multiple displays and a large lens for reconstruction, leading to a large depth and large volume, and heavy demands on computing power.

Another way of enlarging the viewing zone is described in the document by T. Mishina, M Okui, F. Okano, "Viewing zone enlargement method for sampled hologram that uses high-order diffraction", Applied Optics, 2002, Vol. 41, No. 8. According to this method, not only the first diffraction order is used for hologram reconstruction, but also further diffraction orders; these are combined to form a common viewing space. The corresponding video holograms for a certain object are shown sequentially on a LC display. With the help of a second LC display, which acts as a spatial frequency filter, the individual diffraction orders are filtered during reconstruction. The visible areas are generated sequentially and joined spatially. The achievable viewing zone is still narrower than 65 mm, so that the reconstructed object can only be viewed with one eye. Again, this method has the disadvantage of heavy demands on computing power. In addition, the pixel arrays are required to have extremely short switching delays.

When joining several diffraction orders sequentially, the displays used must have a high resolution and a high switching speed to prevent the image from flickering. This is why binary holograms are often used. However, they suffer from substantial errors caused by binary encoding.

A common additional disadvantage of the cited known holographic methods is the heavy demand on computing power for encoding the holograms.

A device described in Document WO 2003/021363 (A1) for reconstructing computer-generated holograms contains a vertically oriented line light source that generates holograms with horizontal parallax only. The line light source generates monochromatic light with a bandwidth of less than 10 nm and which is coherent in the horizontal direction but incoherent in the vertical direction.

In conventional holographic displays, the viewing window is much larger than the pupil of the eye is. A consequence is much effort is done to project light into regions where no observer is located.

A basic idea of applicant's former patent application WO 2004/044659 (A2) is to reduce the viewing window to a size that is just slightly larger than the pupil of an eye. This will significantly lessen the requirements on the maximum pixel size. The document describes a device for reconstructing video holograms in a reduced size viewing window. The device contains at least one point light source or line light source (which provides sufficiently coherent light), a lens, and a holographic array with cells arranged in a matrix with at least one opening per cell, the phase, or amplitude of the opening being controllable. A viewing plane is located in the image plane of the light source.

The hologram information is sampled in pixels and displayed on an LCD array. Sampled holograms always have the property of periodic repetitions of the reconstructed scene and the viewing window. Care has to be taken that the viewing windows do not overlap, as in that case multiple reconstructions would be seen. Limiting the area on the hologram on which the scene information is encoded can avoid an overlap. This area has to be limited such that light emanating from reconstructed scene points is confined to one viewing window. Therefore, the device reconstructs a video hologram in one periodicity interval of the Fourier transform in a viewing plane. The reconstructed three-dimensional scene can be viewed with both eyes through a viewing window located in front of the eyes. The reconstructed scene is visible inside a reconstruction frustum, which stretches between the display area and the viewing window; the scene can thereby be reconstructed on, in front of or behind the array surface. The known solution allows the use of a conventional array with resolution near 3 million pixels at reasonable hardware expenses and computing power.

A light source according to this document is considered sufficiently coherent if the light is spatially coherent to an extent that it allows interference, so that it is at least suitable for a one-dimensional holographic reconstruction with an adequate resolution. These requirements can also be met by conventional light sources, like an LED arrangement, if they radiate light through an adequately narrow gap. The spectral bandwidth of high-brightness LEDs is sufficient to ensure temporal coherence for holographic reconstruction. A line light source can be considered a point light source if seen from a right angle to its length. The light is then coherent in this direction and incoherent in the perpendicular direction. In order to ensure temporal coherence, the light must have an adequately narrow wavelength range. Color holograms can be displayed when the information may be divided spatially into spectral portions monochromatically, sequentially or by way of filter means. The electronically controllable pixels arranged in the holographic array can be an intensity-modulating SLM, a phase-modulating SLM or an SLM that modulates both the amplitude and the phase of the light capable of generating interference. Pixel arrays, which are unable to directly control the phase of the coherent light, like a conventional LCD, may use the known detour phase coding method so that amplitude settings with several controllable pixels per holographic image point control the light phase. For encoding a complex value for a single holographic image point of the array such known encoding technique uses three electronically controllable pixels.

In contrast to common known solutions, the present invention and the solution according to application WO 2004/044659 (A2) encodes the hologram information of a single scene point to a restricted encoded area of the holographic array only. The extension and position of the encoded area are chosen such that the reconstructed scene point is visible only within the viewing window. The observer cannot see the periodic repetitions of the reconstructed scene point, as the light emanating from those points does not reach the central viewing window. The extension and position of the encoded area depend on the x, y, and z coordinates of the scene points.

The pupil of each eye has to be located in the viewing window. Due to the smallness of the window, an eye position-tracking device detects the observer's eyes and controls the position of the viewing window according to the observer's movement. Vertical tracking is achieved by vertical shifting of the light source. This will shift the viewing window containing the reconstructed scene.

Another way to reduce the expense of reconstruction video holograms is to assign two separate viewing windows, each to one eye of the observer, achieved by two separate, adequately coherent light sources being alternately turned on and two separate holograms encoded synchronously with the switchover of the light sources. The SLM alternately encodes the two video holograms displaying different perspective views. Due to the low refresh frequency and long switching delays of available hardware, a sequential representation leads however to cross talk between the two eyes.

SUMMARY OF THE INVENTION

It is an object of this invention to reconstruct video holograms in real-time using electronically controlled pixels arranged in an array with a minimal resolution (e.g. commercially available at reasonable cost for the mass market), a minimum of flickering and cross talk; reconstruction is simultaneous for both eyes over a large viewing area, so that the required refresh rate is substantially low.

In order to achieve this object, the present invention is based on a method for encoding and reconstructing video holograms where coherent light supplied by a line light source and imaged by optical focusing means passes through controllable pixels of a single holographic array into viewing windows, which are located in one diffraction order near the eyes of an observer, in order to reconstruct a scene holographically encoded by the controllable pixels and thus to render it visible through two separate viewing windows for the observer's two eyes.

According to the present invention, the light used is only coherent in the vertical direction, so that the controllable pixels generate a vertical, one-dimensional reconstruction of holograms of the same 3D scene for both eyes of the observer. The encoding of the holographic array is horizontally split into two groups of pixel columns. Each group is assigned to one of two separate video holograms: each displays one of the two perspective views (one for each eye). The holographic array is encoded with both groups of pixel columns horizontally interleaved at the same time; thereby two spatially interleaved holograms of a scene are generated. This means that all pixel columns of a first column group of the pixel array reconstruct a hologram for one eye of an observer, while the adjacent pixel columns of the second column group reconstruct the hologram for the other eye at the same time. Since the horizontally incoherent light reconstructs the scene in a conventional way, known image separation means with separating elements arranged parallel to the columns can be used to select the two holograms for the left and right eye. The image separation means is disposed at a distance to the pixel array and reveals the column group for one eye and covers the column group for the other eye.

It is further an object of the invention to provide a device for encoding and reconstructing video holograms using a flat and thin housing and that avoids costly and heavy optical and electronic hardware components with large physical dimensions.

The device according to the present invention is based on a line light source which provides coherent light and which consists of vertical focusing means and a pixel array, which contains controllable pixels, which modulate amplitude or phase or both parameters of the coherent light.

According to the present invention, the light source is arranged horizontally, so that its light is coherent in the vertical direction and incoherent in the horizontal direction. One-dimensional video holograms are encoded by controllable pixels of the pixel array in pixel columns so that a first and a second column group separately encode a one-dimensional, vertically diffracting hologram of the same scene for the two eye positions, where both column groups are interleaved horizontally. The pixel columns are interleaved in such a way that the image separation means, which is in the optical path of the light, exposes or reveals the column groups for one eye of the observer, and covers it for the other eye with the help of separating elements arranged parallel to the gaps. A hologram for each eye reconstructs the three-dimensional scene in the reconstruction space in front of each respective viewing window. The two holograms differ in a horizontal parallax according to the observer's eye distance. The two holographically encoded column groups represent two holographic reconstructions of the same scene. Both eyes see these holograms at the same time in separate viewing windows.

A barrier mask may be disposed at a distance to the pixel array as an image separation means. The separating elements are then transparent and non-transparent stripes which always reveal one of the interleaved column groups for the left or right eye of an observer and which cover the ones for the other eye.

The holographically encoded columns of a group preferably reconstruct partial images of the same scene according to the eye position: the partial images are composed to form a total reconstruction of the scene when viewed with both eyes.

The order of execution of the above-mentioned process steps may vary. In particular, the steps of focusing, holographic modulation and hologram separation may be swapped.

In order to make available the viewing windows in a large zone for the observer, an eye position detection system tracks the horizontal, vertical and preferably also the axial position of observer's eyes so that the position of the viewing windows can follow accordingly if the observer moves. Alternatively, the encoding device can change or re-calculate the encoded hologram from a different perspective view based on the new observer position, so that the reconstructions appear for the observer displaced and/or turned, i.e. seen from a different angle. Depending on the eye positions, the pixel array may be re-encoded with the help of software so that the holographic reconstruction becomes visible at a fixed spatial position.

If the vertical positions of the observer's eyes change, the viewing windows are tracked by vertical displacement of the light source.

If the horizontal positions of the observer's eyes change, the viewing windows are preferably tracked by displacing the column groups in relation to the image separation means. Alternatively, the image separation means, and in particular the separating elements, may be displaced in relation to the column groups. The use of horizontal line light sources facilitates viewing window tracking.

If the positions of the observer's eyes change axially, the distance between light source and optical focusing means will be adapted accordingly.

Tracking the viewing windows according to the positions of the observer's eyes in front of the display ensures that the holographic reconstruction is visible in a large zone at continuously high reconstruction quality.

Now, the method and device according to the present invention will be described in more detail with the help of an embodiment. The principle of the invention will be explained based on a holographic reconstruction with monochromatic light. However, those skilled in the art will appreciate that this invention may as well be applied to color holographic reconstructions. In the latter case the controllable pixels in each pixel column represent the primary colors required for a color reconstruction in a spatially or temporally multiplexed way. The present invention therefore enables full colour, full motion holographic television, films, computer games and specialist applications benefiting from 3D video reproduction.

These and other features of the invention will be more fully understood by reference to the following drawings.

DETAILED DESCRIPTION OF THE INVENTION

During the course of this description, like numbers will be used to identify like elements according to the different views that illustrate the invention.

In the preferred embodiment of the invention, the information about a three-dimensional scene is encoded in a transmissive holographic array, where the pixels are computer controlled according to the encoding to form a pixel pattern. However, the basic idea of the invention is not limited to the described transmissive holographic array. Both transflective and reflective holographic arrays or arrays that directly modulate the phase of the light waves, such as Freedericksz cells, may be used.

Figure 1:
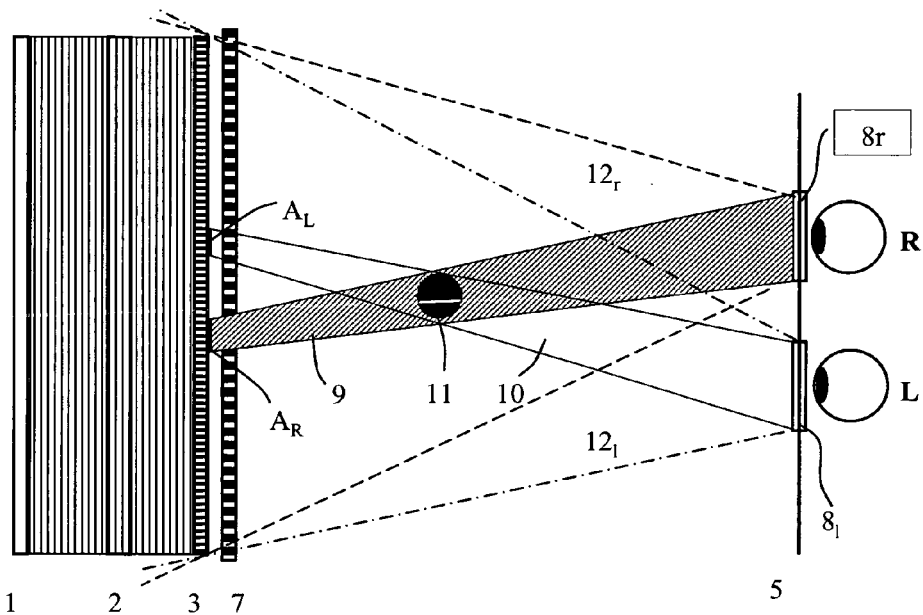
FIG. 1 shows a reconstruction of a 3D scene with two bundles of rays between a viewing plane and image separation means (top view).

FIG. 1 shows a line light source 1 that illuminates, via focusing means 2, a holographic array 3. The focusing means 2 is a horizontally disposed cylindrical lens that images the light of the line light source 1 into a viewing plane 5 containing viewing windows 8r, 8l.

FIG. 1 relates to a holographic encoding of a single small object; the holographic array reconstructs the 3D scene to be displayed. The small reconstructed object 11 is shown by a circle. According to the invention, the holographic information of the reconstructed object 11 is encoded in two restricted areas AL and AR of the holographic array 3 only. The extent and positions of the encoded areas AL, AR are chosen such that the reconstructed object 11 is visible only within the corresponding viewing windows 8r or 8l.

For reconstructing the object 11, the holographic array 4 is encoded with a pixel pattern that forms bundles of light rays 9 and 10, being spatially light modulated by passing through the controllable transmissive pixels of the holographic array 3.

According to the present invention, the horizontally disposed line light source 1 generates light that is spatially coherent in the vertical direction and incoherent in the horizontal direction due to its linear orientation. On the pixels of holographic array 3, patterns of two different video holograms are encoded, which are arranged in columns; the columns only reconstruct in the vertical direction. The holograms can be seen in a diffraction order through a viewing window 8r, 8l in the viewing plane 5. Due to the incoherence of the light in the horizontal direction, the light source 1 is only imaged by focusing means 2.

FIG. 1 shows further an image separation means 7 making the bundle of rays 9 for the right eye R visible and a bundle of rays 10 for the left eye L.

Because the focusing means 2 and the holographic array 3 are disposed at a minimum distance to each other, their position may even be swapped. The image separation means 7 with its separating elements in the optical path may also be disposed at various positions.

The optical focusing means 2 may be a vertically focusing cylindrical lens as shown, a Fresnel lens or a lenticular.

The holographic array 3 corresponds with that of a high-resolution transmissive flat display, e.g. a conventional LCD. If the detour phase method (or a similar method that modulates the amplitude of the light) is used for setting the phase relation, a higher diffraction order in a periodicity interval is used for holographic reconstruction. Further, the pixels needed for phase control must be disposed next to each other in the vertical direction, because the light is not capable of creating interference in the horizontal direction. Pixel arrays typically used in flat displays have sub-pixels disposed next to each other in the horizontal direction; this is why such arrays must be turned by 90°. Pixel arrays with pixels which directly modulate both amplitude and phase of the light, may preferably be used, such as light modulators based on Freedericksz cells.

Figure 2:
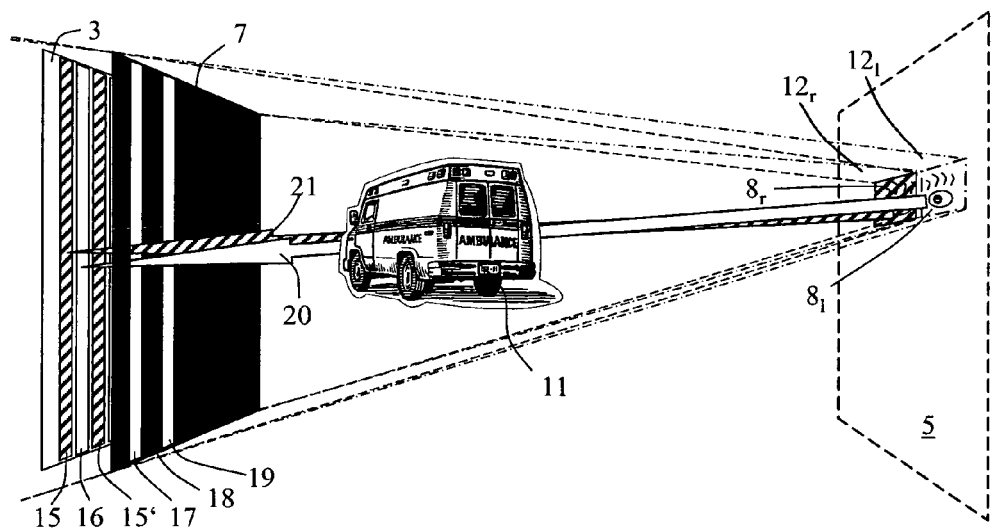
FIG. 2 shows a detail of the device according to the invention (projection).
Figure 3:
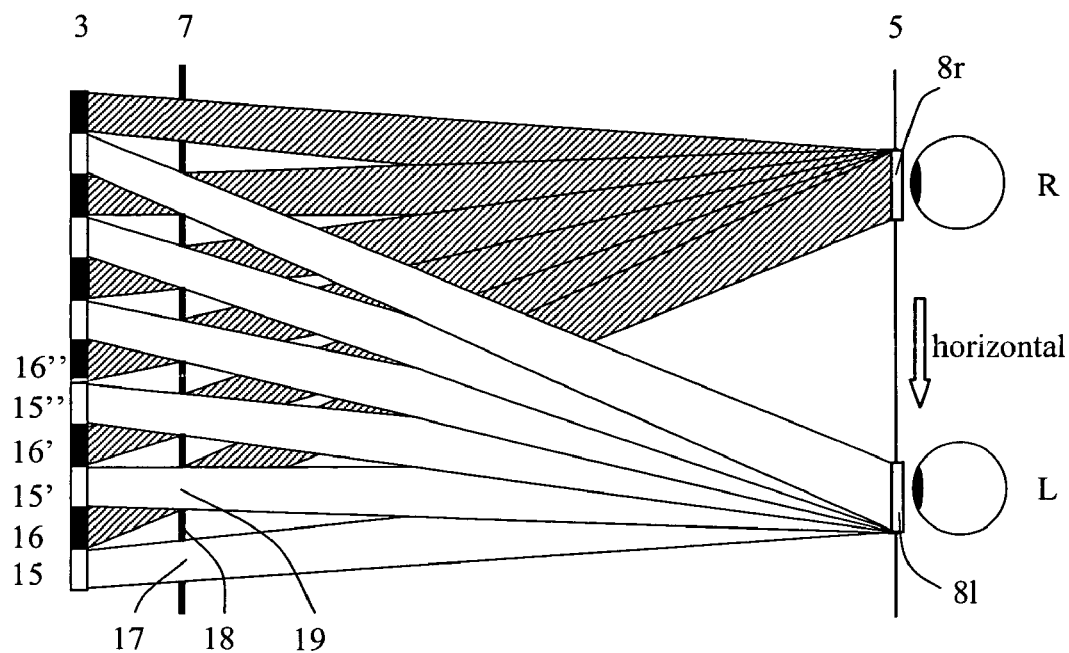
FIG. 3 shows a detail of the device according to the invention (top view).

FIG. 2 shows the device according to the invention in a projection view, and FIG. 3 shows the top view of a detail. The vertically coherent illumination of each hologram results in a reconstruction 11 of the three-dimensional scene that is generated in frustums 12r, 12l that stretch between the edges of the pixel array 3 and the viewing windows 8r, 8l. In contrast to FIG. 1, FIG. 2 shows a holographic reconstruction 11 of a complete 3D scene. The reconstruction 11 may be located in front of, on or behind the holographic array 3. The horizontally incoherent illumination allows known image separation means to be used to select the holograms for each respective eye, so that a reconstruction of the scene with horizontal parallax is generated by the two holograms when viewed with both eyes. This means that both holograms differ in a horizontal parallax according to the eye distance. One-dimensional video holograms are encoded in controllable pixels of the pixel array 3 arranged in pixel columns 15, 15' to 16", where the column group 15, 15' and 15" reconstructs a one-dimensional hologram for the right eye R of the observer, and the column group 16, 16' and 16" reconstructs a one-dimensional hologram of the same scene for the left eye L of the observer. In the described embodiment, the two column groups are alternately interleaved in the horizontal direction. The pixel columns 15 to 16" are interleaved in such a way that the image separation means 7 (which is in the optical path of the light and which consists of separating elements 17, 18, 19 arranged in line with the pixel columns 15 to 16") reveals the column group 15, 15' and 15" for one eye of the observer and covers the column group 16, 16' and 16", respectively, for the other eye.

The spatially interleaved holograms may be separated with the help of a barrier mask having vertical, alternately transparent and non-transparent stripes 17, 18, 19, the mask being disposed in front of or behind the pixel array 3. The transparent stripes reveal the first column group 15, 15' and 15" for the right eye R. The first column group is at the same time covered by the non-transparent stripes for the left eye L1. In FIG. 2, the arrows 20 and 21 show the view of the observer from the tracked, virtual viewing windows 8r, 8l in the viewing plane 5 to the pixel columns 15 and 16 using the simplified example of a single column 15, 16 of each column group. In reality, several hundreds of pixel columns and pixel column groups contribute to the interleaved holographic reconstructions of the three-dimensional scene 11. The image separation means contains as many separating elements.

The distance between the image separating mask 7 and the pixel array 3 (see FIG. 4) and the distance between the individual stripes, which are preferably of the same width, is chosen so that only the video holograms intended for one eye are visible for the observer.

According to a preferred embodiment of the present invention, several adjacent pixel columns may be grouped to form a common multiple pixel column. Each multiple pixel column belongs to one of the two holograms and is rendered visible as a whole hologram for the respective eye R or L by the image separation means 7. In this case, the multiple pixel columns of the two holograms interleave alternately instead of the single pixel columns.

Encoding holograms in multiple pixel columns reduces cross-talking effects. If the observer moves horizontally, full tracking of the viewing windows can effectively suppress image distortions. The pixel columns of the multiple pixel columns preferably modulate the light differently. For example, only one pixel column of two or more adjacent pixel columns of each multiple pixel column actively modulates the light, whereas the other one(s) are inactive. This means they are turned off The movement range without cross talk from the hologram for the other eye increases accordingly.

This results in a desired zone between the two viewing windows in which no reconstruction is visible. Without this measure, an observer would see a distorted reproduction in this zone until the viewing window is tracked. Viewing window tracking in the horizontal direction can only be accelerated if the position detection system activates and deactivates individual pixel columns within multiple pixel columns when the observer moves horizontally.

The image separating means may be a barrier mask, a lenticular designed for this purpose or a prism mask. The image separating elements of a preferred embodiment has about twice the pitch of the corresponding column group of the pixel array.

A position detection system (not shown) is used to track the position of the viewing windows.

Changes in the horizontal eye position can be tracked by displacing the separating elements of the image separation means 7. This can be done electronically, for example with the help of another transmissive pixel array with controllable openings.

Alternatively, the column groups 15 to 16' can be displaced horizontally in relation to the image separation means 7 to track the viewing windows 8r, 8l. This may also be done electronically, preferably with the help of above-mentioned multiple pixel columns. If only one pixel column of each multiple pixel column is active at a time to modulate the light, switching over to a different pixel column of a multiple pixel column can support horizontal tracking.

Further, both horizontal displacement methods may be carried out simultaneously. The viewing windows may be tracked in the vertical direction by vertically displacing the line light source 1. Changing the distance between the light source 1 and the cylindrical lens 2 may compensate for an axial position change.

If an observer moves, not only will the viewing windows be tracked. The contents of the holograms may also be recalculated and re-encoded accordingly to take into account the different perspective.

A distinctive feature of the solution proposed by this invention is that for each of the observer's eyes R, L a corresponding video hologram is calculated, encoded and reconstructed at the same time, and that these holograms are spatially interleaved using a single pixel array 3, and that these two holographic reconstructions may be rendered visible separately in the respective viewing windows 8R, 8L for the right and left eye using the image separation means 7.

The two video holograms are characterized by a horizontal parallax that corresponds to the eye distance. This ensures a true 3D impression of the scene.

The simultaneous holographic reconstruction of the scene for both of the observer's eyes guarantees a natural view, so that the accommodation and convergence of the observer's eyes on any point of the scene is ensured, given correct focusing.

The vertical dimension of the viewing window is within one diffraction order and should not exceed the periodicity interval of the reconstruction of the video hologram. Otherwise the observer will see a superposition of the reconstruction of two adjacent diffraction orders. Further, the size of the viewing windows must be adapted to the positioning precision and the tracking speed. A deliberate narrowing of the vertical size of the viewing window for encoding, as known from WO 2003/021363 (A1), for example to 10 mm, reduces the required display resolution and the volume of data to be processed and transmitted at least by a factor of 100.

The present invention makes it possible to use commercially available controllable matrices, e.g. LCD flat displays, for hologram reconstructions. In case of color encoding, the alternate RGB sub-pixels for the three primary colors reconstruct three individual partial holograms of a primary color, which are then composed to form a color reconstruction.

Figure 4:
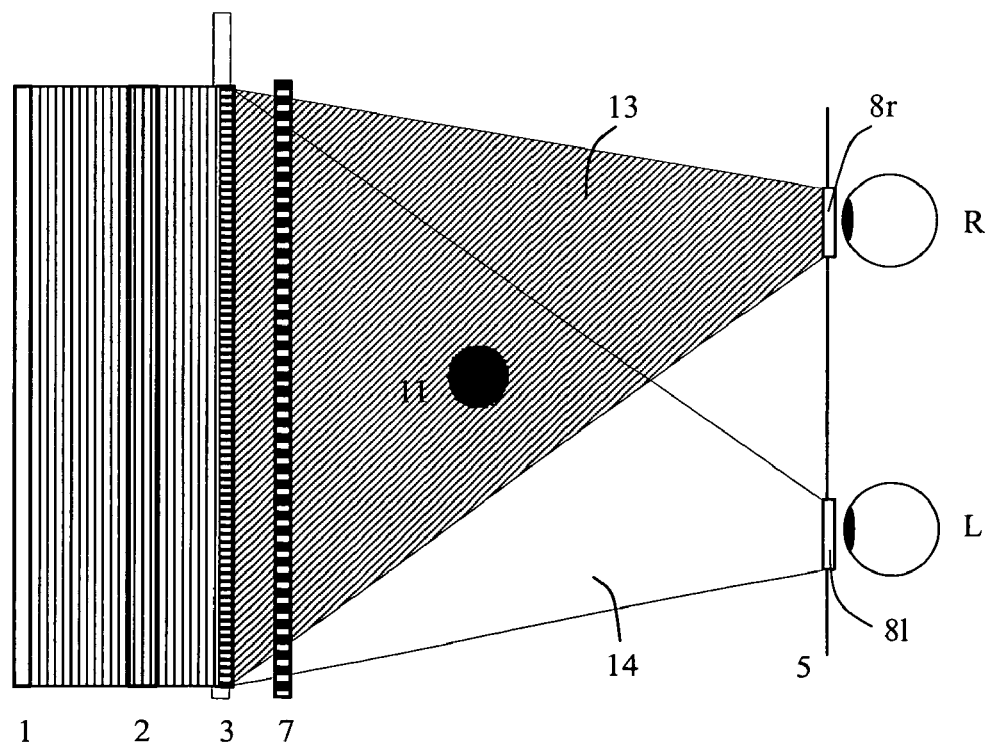
FIG. 4 shows a reconstruction of a scene, which can be perceived by the observer (top view).

FIG. 4 shows a device according to the invention with all superimposed bundles of rays 13 for the right eye and bundles of rays 14 for the left eye.

A major benefit of the present invention is that the display is run in a space-multiplex mode at double the image frequency compared to a time-multiplex mode. Thereby, two spatially interleaved holographic reconstructions of a three-dimensional scene are encoded in one pixel array, but are seen separately by the observer thanks to the image separation. This method allows halving of the image frequency.

The viewing windows 8R, 8L must have a size of at least the dimension of the eye pupil so that the observer is able to view a flawless holographic reconstruction. However, this minimum size would make extreme demands on the tracking precision and speed, which it may be unrealistic to achieve, so that in practice the viewing windows must be considerably larger. However, the height of the viewing window cannot exceed the extent of the periodicity interval. Further, it is necessary to adjust the width of the viewing windows. Based on the width of the pixel columns, this is achieved by matching the lateral extent with the dimensions of the image separation means, in particular with the pitch and width of the separating elements. The two viewing windows are disposed with their centres about an eye distance apart.

The use of one-dimensional, vertically reconstructing holograms, in conjunction with horizontally incoherent light, for scene reconstruction considerably reduces the computing power required for the provision of encoding data. Also the demands on the resolution of the pixel array in the horizontal direction are not critical, so that large-area video holograms can be reconstructed with little effort in a large viewing zone, thus allowing the eye positions of an observer to move.

In contrast to point light sources, the line light source used allows a continuous reconstruction even with lateral movement of the observer.

Another advantage of the present invention is that a conventional white light source can be used in combination with a slot mask, instead of a laser.

The invention is suitable for both the entertainment sector, i.e. for TV, multimedia, game stations and mobile telephone terminals, and for commercial applications such as 3D CAD, in medical and military equipment, as well as many other appliances involving displays.

While the invention has been described with reference to the preferred embodiment thereof, it will be appreciated by those of ordinary skill in the art that modifications may be made to the parts that comprise the invention without departing from the spirit and scope thereof.

The invention claimed is:

1. Method for encoding and reconstructing video holograms, where optically vertical focusing means image vertically coherent light emitted by a line light source and modulated by electronically controllable pixels of a holographic array into a viewing plane with viewing windows, in order to holographically reconstruct a three-dimensional scene within one diffraction order by way of diffraction at the pixels and to render this scene visible from the viewing windows for both eyes of an observer, wherein the controllable pixels encode two separate holograms of left or right eye perspective views of the same scene in separate pixel columns, one for each of the observer's eyes, said holograms being one-dimensional in the vertical direction, where the pixels are arranged in separate column groups so that the two one-dimensional holograms are horizontally interleaved, and an image separation means with separating elements arranged parallel to the pixel columns reveals the respective pixel columns for one eye and covers them for the other eye.

2. Method according to claim 1 where the holograms for both of the observer's eyes encode a horizontal parallax according to the eye to eye separation distance.

3. Method according to claim 1 where local changes in the observer's eye positions are tracked by an eye position tracking system.

4. Method according to claim 3 where the holographic encoding of the pixels in the pixel columns is updated according to a change in eye positions.

5. Method according to claim 4 where the reconstructed scene is encoded so that it will appear for the observer at a fixed horizontal or vertical or axial position as the eye positions change.

6. Method according to claim 4 where the reconstructed scene is encoded so that it appears for the observer horizontally or vertically displaced or turned depending on a horizontal or vertical and or axial change in the eye positions.

7. Method according to claim 3 where the viewing windows are tracked by vertically displacing the line light source according to vertical change of the eye positions.

8. Method according to claim 3 where the viewing windows are tracked by horizontally displacing the column groups in relation to the image separation means according to horizontal change of the eye positions.

9. Method according to claim 3 where the viewing windows are tracked by horizontally displacing the separating elements of the image separation means in relation to the pixel columns according to horizontal change of the eye positions.

10. Method according to claim 3 where the distance between the light source and the optical focusing means is adapted accordingly according to axial change of the eye positions.

11. Device for encoding and reconstructing video holograms, comprising a line light source emitting light, which is coherent in one direction and an optical focusing means, in order to holographically reconstruct a scene in frustum-shaped reconstruction spaces after modulating the light by controllable pixels arranged in a holographic array, characterized by the line light source being arranged horizontally so that its light shows adequate coherence in the vertical direction, the controllable pixels are arranged in pixel columns with one column group for each of a viewer's eyes, and contain one-dimensional, vertically encoded holograms of left or right eye perspective views of the same scene, where both column groups are interleaved horizontally, and an image separation means with separating elements arranged parallel to the pixel columns that reveals the pixel columns for one eye and covers them for the other eye.

12. Device according to claim 11 where several adjoining pixel columns each are combined to form common multiple pixel columns, where every multiple pixel column is selectable as a whole for the respective eye by the image separating means in order to suppress cross-talking between the reconstructions of the holograms or to adjust the size of the viewing windows.

13. Device according to claim 12 where the pixel columns of a multiple pixel column modulate the light differently.

14. Device according to claim 12 where the viewing windows have at least the size of a pupil, are defined by the width of the image separation means in horizontal direction for each eye, and are such that the centres of the two windows are about an interocular distance apart.

15. Device according to claim 12 where the viewing windows for the two eyes have a vertical extension which is not greater than the periodicity interval of one diffraction order but which is not smaller than a pupil.

16. Device according to claim 11 where the pixels are transmissive or reflective and modulate the amplitude or optical phase of the coherent light.

17. Device according to claim 11 where the optical focusing means is a vertically focusing cylindrical lens, Fresnel lens or lenticular.

18. Device according to claim 11 where the image separation means is a barrier mask, lenticular or prism mask.

19. Device according to claim 18 where the pitch of the separating elements of the baffler mask the prism mask or the lenticular is about twice the horizontal pitch of the corresponding column group of the controllable pixel array.

20. Device according to claim 11 where the image separation means is a baffler mask with transparent stripes which reveal the column groups intended for one eye of the viewer and with non-transparent stripes which cover the other column groups for that eye.

21. Device according to claim 11 where the controllable pixels further comprise sub-pixels for colour reconstruction and are disposed one below the other vertically for detour phase encoding.

* * * * *

UNITED STATES PATENT AND TRADEMARK OFFICE
CERTIFICATE OF CORRECTION

| | | |
|---|---|---|
| PATENT NO. | : 7,400,431 B2 | Page 1 of 1 |
| APPLICATION NO. | : 11/222277 | |
| DATED | : July 15, 2008 | |
| INVENTOR(S) | : Schwerdtner et al. | |

It is certified that error appears in the above-identified patent and that said Letters Patent is hereby corrected as shown below:

Col. 12, line 24; Claim 19, please change "baffler" to --barrier--; and

Col. 12, line 28; Claim 20, please change "baffler" to --barrier--.

Signed and Sealed this
Twenty-fifth Day of January, 2011

David J. Kappos
*Director of the United States Patent and Trademark Office*